(12) United States Patent
Miyoshi et al.

(10) Patent No.: US 11,273,905 B2
(45) Date of Patent: Mar. 15, 2022

(54) ELECTRIC ACTUATOR DEVICE

(71) Applicant: MITSUBISHI HEAVY INDUSTRIES, LTD., Tokyo (JP)

(72) Inventors: Masato Miyoshi, Tokyo (JP); Daiki Hatakeyama, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 216 days.

(21) Appl. No.: 16/617,257

(22) PCT Filed: Oct. 12, 2018

(86) PCT No.: PCT/JP2018/038180
§ 371 (c)(1),
(2) Date: Nov. 26, 2019

(87) PCT Pub. No.: WO2019/097919
PCT Pub. Date: May 23, 2019

(65) Prior Publication Data
US 2021/0129976 A1 May 6, 2021

(30) Foreign Application Priority Data
Nov. 16, 2017 (JP) .............................. JP2017-220908

(51) Int. Cl.
*B64C 13/50* (2006.01)
*B64C 9/02* (2006.01)

(52) U.S. Cl.
CPC ................ *B64C 13/50* (2013.01); *B64C 9/02* (2013.01)

(58) Field of Classification Search
CPC .............. B64C 13/50; B64C 9/02; B64C 5/08
See application file for complete search history.

(56) References Cited

U.S. PATENT DOCUMENTS 1,989,291 A * 1/1935 Prewitt ..................... B64C 5/08
244/38
3,965,798 A   6/1976 Estlick
(Continued)

FOREIGN PATENT DOCUMENTS

DE    10 2010 024 121    12/2011
JP         8-142993       6/1996
(Continued)

OTHER PUBLICATIONS

Extended European Search Report dated Jun. 23, 2020 in corresponding European Patent Application No. 18879263.4.
(Continued)

*Primary Examiner* — Rodney A Bonnette
(74) *Attorney, Agent, or Firm* — Wenderoth, Lind & Ponack. L.L.P.

(57) ABSTRACT

An electric actuator device is provided with: an electric actuator body that has a first fulcrum connected to a rudder surface side of an aircraft and a second fulcrum connected to the aircraft body side, and is driven by an electric motor such that the first fulcrum and the second fulcrum can be brought closer together and drawn further apart; a support member for advancing/retracting between a support position at which the support member supports the first fulcrum or the second fulcrum thereunder, and a retracted position at which the support member is retracted from under the first fulcrum or the second fulcrum; and a retention member for retaining the first fulcrum or the second fulcrum when the support member is located in the retracted position.

5 Claims, 6 Drawing Sheets

(56) References Cited

U.S. PATENT DOCUMENTS

| | | | |
|---|---|---|---|
| 4,173,322 | A | 11/1979 | Macdonald |
| 6,257,528 | B1* | 7/2001 | Brislawn .............. B63H 25/381 |
| | | | 244/211 |
| 2003/0080246 | A1 | 5/2003 | Koizumi et al. |
| 2006/0255207 | A1 | 11/2006 | Wingett et al. |
| 2009/0146013 | A1 | 6/2009 | Sheahan, Jr. et al. |
| 2017/0152025 | A1 | 6/2017 | Stefes et al. |
| 2017/0283039 | A1* | 10/2017 | McCormick .............. B64C 9/22 |
| 2019/0308719 | A1* | 10/2019 | Huynh ................... B64C 13/503 |
| 2020/0198769 | A1* | 6/2020 | Miyazono ............... F16H 19/02 |

FOREIGN PATENT DOCUMENTS

| | | |
|---|---|---|
| JP | 2000-159195 | 6/2000 |
| JP | 2000-335496 | 12/2000 |
| JP | 2003-112693 | 4/2003 |
| JP | 2013-42602 | 2/2013 |
| JP | 2015-34575 | 2/2015 |
| WO | 01/05654 | 1/2001 |

OTHER PUBLICATIONS

International Search Report dated Nov. 27, 2018 in corresponding International Application No. PCT/JP2018/038180.

* cited by examiner

ELECTRIC ACTUATOR DEVICE

TECHNICAL FIELD

The present invention relates to, for example, an electric actuator device suitable for being adopted in a rudder surface actuator of an aircraft.

BACKGROUND ART

In recent years, as an electric actuator becomes lighter and has higher output, an opportunity of adopting the electric actuator in operating a rudder surface of an aircraft increases. However, in a case where a ball screw mechanism is adopted in the electric actuator, there is a concern over the occurrence of mechanical jamming in which a ball nut is fixed on a rotating screw. In a case where the mechanical jamming has occurred, the rudder surface of the aircraft is fixed at an unintended position, and thereby it is difficult to control an airframe as a pilot intends. Thus, there is a possibility of resulting in a severe accident. Therefore, it is desirable to release the rudder surface fixed at the unintended position from mechanical jamming.

An electric actuator that prevents some malfunction from hindering overall operation by adopting a configuration, in which two systems of ball screw mechanisms are accommodated in a housing, the driving of the ball screw mechanisms can be operated or locked independently of each other, and a state where mechanical connection to each other is cut off is caused, is disclosed in PTL 1.

CITATION LIST

Patent Literature

[PTL 1] Japanese Unexamined Patent Application Publication No. 2013-42602

SUMMARY OF INVENTION

Technical Problem

However, in the technique of PTL 1, the two systems of ball screw mechanisms, a motor that operates the ball screw mechanisms independently of each other, and a clutch mechanism for locking are necessary. Consequently, there is a concern over a complicated structure, an increase in the number of components, and a significant weight increase.

The present invention is devised in view of such circumstances, and an object thereof is to provide an electric actuator device that can easily release mechanical connection between a rudder surface and an aircraft body side caused by an electric actuator and has a simple structure.

Solution to Problem

In order to solve the problems, the electric actuator device adopts the following means.

According to an aspect of the present invention, there is provided an electric actuator device including an electric actuator body that has a first fulcrum connected to a rudder surface side of an aircraft and a second fulcrum connected to an aircraft body side and is driven by an electric motor such that the first fulcrum and the second fulcrum are brought closer to or separated away from each other, a support member that advances and retracts between a supporting position at which the support member supports a lower side of the first fulcrum or the second fulcrum and a retracted position at which the support member is retracted from the lower side of the first fulcrum or the second fulcrum, and a holding member that holds the first fulcrum or the second fulcrum when the support member is positioned at the retracted position.

In the electric actuator device according to the aspect, an arm of the rudder surface of the aircraft and the aircraft body side are connected to each other are brought closer to or separated away from each other by the first fulcrum and the second fulcrum of the electric actuator body, and the holding member that holds the first fulcrum or the second fulcrum when the support member is positioned at the supporting position where the lower side of the first fulcrum or the second fulcrum is supported and the retracted position is included. According to this, the first fulcrum or the second fulcrum is released from supporting by moving the support member that supports the first fulcrum or the second fulcrum of the electric actuator body from below to the retracted position, and connection to the first fulcrum or the second fulcrum can be released. In addition, the released first fulcrum or the released second fulcrum is held by the holding member, and does not fall off. Accordingly, connection between the rudder surface on a first fulcrum side and the aircraft body side on a second fulcrum side, which are connected to each other via the electric actuator body, can be cut off, and mechanical restraint between the rudder surface and the aircraft body side caused by the electric actuator body can be easily released. In addition, since the first fulcrum or the second fulcrum is held by the holding member and thereby does not fall off, a risk of other components or an aircraft body becoming damaged can be reduced. Since the electric actuator device is configured by a combination of simple mechanisms, assemblability, maintenance, and reliability with respect to malfunction are good.

In the electric actuator device according to the aspect of the present invention, the support member advances and retracts with respect to the second fulcrum.

In the electric actuator device according to the aspect, the support member advances and retracts with respect to the second fulcrum. According to this, even in a case where a rudder angle is large, a load caused by an axial force of the electric actuator body, which is applied to the support member, is small, and thus an advancing and retracting operation of the support member can be performed with small power.

In addition, the electric actuator device according to the aspect of the present invention further includes an electric motor for a support member that performs an advancing and retracting operation of the support member, a control unit that controls the electric motor for a support member, and a failure detecting unit that detects a failure in an operation of the electric actuator body. The control unit operates the support member to move from the supporting position to the retracted position in a case where the failure in the operation of the electric actuator body is detected by the failure detecting unit.

In the electric actuator device according to the aspect, the control unit operates the support member to move from the supporting position to the retracted position in a case where the failure in the operation of the electric actuator body is detected by the failure detecting unit. According to this, for example, in a case where a failure such as mechanical jamming of the electric actuator body occurs and the rudder surface is fixed at an unintended rudder angle, the electric motor for a support member can be driven by a signal from the control unit. When the electric motor for a support member is driven, the support member that supports the first fulcrum or the second fulcrum from below moves to the retracted position, and thereby the first fulcrum or the second fulcrum is released. As a result, connection between the rudder surface on the first fulcrum side and the aircraft body side on the second fulcrum side, which are connected to each other via the electric actuator body, can be cut off, and mechanical connection between the rudder surface and the aircraft body side caused by the electric actuator body can be easily released. Accordingly, the rudder surface comes into a free state of not going against an air flow around a wing, and thus a risk factor for aircraft airframe control caused by fixing of the rudder surface at the unintended rudder angle can be excluded. In this case, since airframe control can be performed by another rudder surface where malfunction has not occurred, airframe controllability can be maintained.

In the electric actuator device according to the aspect of the present invention, the holding member is a pendulum that includes a movable guide path in which the first fulcrum or the second fulcrum is held, and has a rotation point above the first fulcrum or the second fulcrum.

In the electric actuator device according to the aspect, the holding member is the pendulum that includes the movable guide path in which the first fulcrum or the second fulcrum is held, and has the rotation point above the first fulcrum or the second fulcrum. According to this, in a case where the support member moves to the retracted position and the first fulcrum or the second fulcrum is released, the first fulcrum or the second fulcrum falls along the guide path included in the pendulum, which is rotatably supported above the first fulcrum or the second fulcrum, and is supported in the guide path. Therefore, the electric actuator body is given with a degree of freedom within a movable range of the pendulum and within a range of the guide path, and consequently, mechanical restraint between the rudder surface on the first fulcrum side and the aircraft body side on the second fulcrum side, which are connected to each other via the electric actuator body, can be released. In addition, since the first fulcrum or the second fulcrum is held in the guide path, a risk of other components or the aircraft body becoming damaged can be reduced.

In addition, restoration convenience is also good since restoration work after actuator body jamming elimination (repair) is performed simply by bringing the support member back to an original position after bringing the first fulcrum or the second fulcrum back to a fixed position along a guide path.

In the electric actuator device according to the aspect of the present invention, the holding member is a wire in which the first fulcrum or the second fulcrum is held.

In the electric actuator device according to the aspect, the holding member is the wire in which the first fulcrum or the second fulcrum is held. According to this, in a case where the support member moves to the retracted position and the first fulcrum or the second fulcrum is released, the electric actuator body is given with a degree of freedom within a movable range of the wire since the first fulcrum or the second fulcrum is held by the wire. Consequently, mechanical restraint between the rudder surface on the first fulcrum side and the aircraft body side on the second fulcrum side, which are connected to each other via the electric actuator body, can be released. In addition, since the first fulcrum or the second fulcrum is held by the wire and thereby does not fall off, a risk of other components or the aircraft body becoming damaged can be reduced.

In addition, restoration convenience is also good since restoration work after actuator body jamming elimination (repair) is performed simply by bringing the support member back to the original position after bringing the first fulcrum or the second fulcrum back to the fixed position.

Advantageous Effects of Invention

In the electric actuator device according to the present invention, mechanical connection between the rudder surface and the aircraft body side caused by the electric actuator body can be easily released and a simple structure can be realized.

DESCRIPTION OF EMBODIMENTS

Hereinafter, one embodiment of an electric actuator device of the present invention will be described with reference to FIGS. 1 to 12.

First Embodiment

First, a configuration of an electric actuator device 10 according to a first embodiment will be described with reference to FIGS. 1 to 11.

Figure 1:
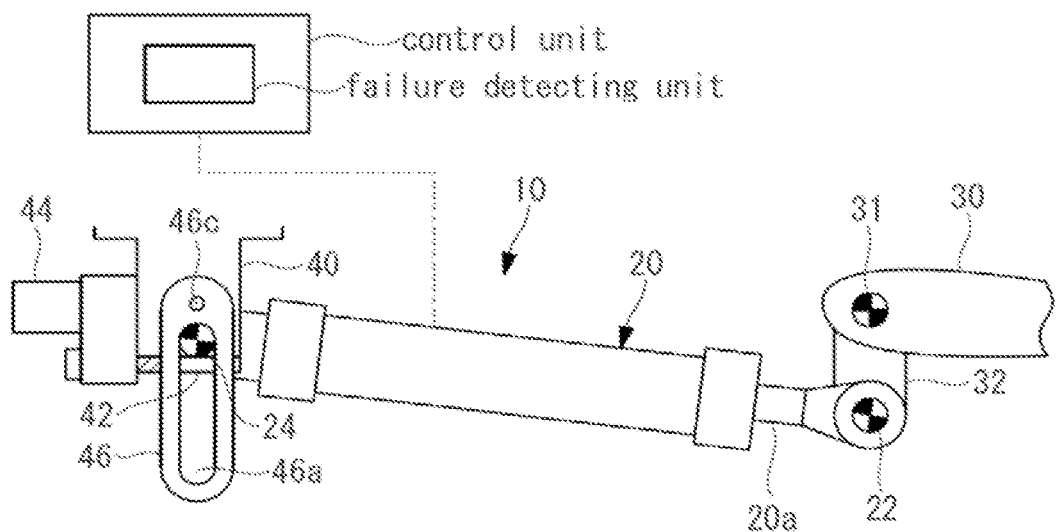
FIG. 1 is a front view of an electric actuator device according to a first embodiment in a case where a support member is set at a supporting position.
Figure 2:
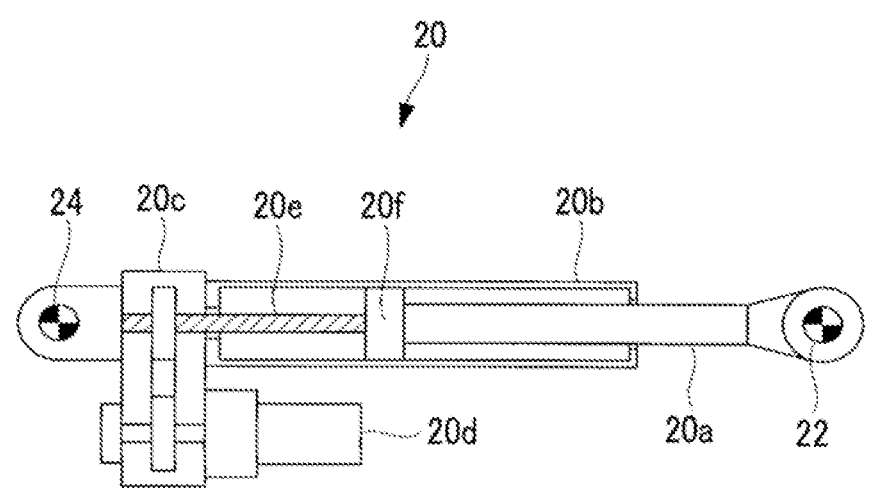
FIG. 2 is a cross-sectional view illustrating an example of a structure of an electric actuator body.

As illustrated in FIG. 1, the electric actuator device 10 according to the embodiment includes an electric actuator body 20. For example, as illustrated in FIG. 2, the electric actuator body 20 includes a cylinder 20*b* and a rod 20*a* of which one end is connected to a ball nut 20*f* that is movable in a right-and-left direction shown in FIG. 2 in response to the rotation of a screw 20e in the cylinder 20b. The screw 20e is driven by an electric motor for a screw 20d via a plurality of gears accommodated in a gearbox for a screw 20c. That is, the electric actuator body 20 is an electric actuator of a ball screw mechanism that can be expanded and contracted by the electric motor for a screw 20d.

A rudder surface side fulcrum (first fulcrum) 22 is provided at an end portion of the rod 20a, which is on an opposite side to the ball nut 20f (the right in FIG. 2). On the contrary, an aircraft body side fulcrum (second fulcrum) 24 is provided at an end portion of the cylinder 20b, which is on an opposite side to the rudder surface side fulcrum 22. That is, the electric actuator body 20 includes the rudder surface side fulcrum 22 on one end thereof, and includes the aircraft body side fulcrum 24 on the other end thereof. By the electric actuator body 20 expanding and contracting, the rudder surface side fulcrum 22 and the aircraft body side fulcrum 24 can be brought closer to or separated away from each other.

A control unit is connected to the electric actuator body 20, and controls such that the rudder surface side fulcrum 22 and the aircraft body side fulcrum 24 are brought closer to or separated away from each other. In addition, the control unit recognizes rotation information of the screw 20e, and recognizes and controls a position of the ball nut 20f (rod 20a) based on the rotation information. The rotation information of the screw 20e refers to information related to a rotational operation of the screw 20e, and can be obtained, for example, by incorporating a rotation angle sensor into the screw 20e. The control unit includes a failure detecting unit that can detect a failure such as mechanical jamming that occurs due to fixing between the ball nut 20f and the screw 20e which are included in the electric actuator body 20. The failure detecting unit determines a failure, for example, by detecting that an actual position of the rod 20a, which is converted from rotation information detected from the rotation angle sensor attached to the screw 20e, does not match a control signal transmitted from an aircraft side.

The control unit is configured with, for example, a central processing unit (CPU), a random access memory (RAM), a read only memory (ROM), and a computer-readable storage medium. A series of processes for realizing various functions are stored, for example, in a storage medium in the form of a program, and the various functions are realized by the CPU reading this program in the RAM and executing information processing and computing processes. A form of being installed in advance in the ROM or other storage media, a form of being provided in a state of being stored in the computer-readable storage medium, and a form of being delivered via communication means in a wired or wireless manner may be applied to the program. The computer-readable storage medium refers to a magnetic disk, a magneto-optical disk, a CD-ROM, a DVD-ROM, and a semiconductor memory.

In FIG. 1, the rudder surface side fulcrum 22 is rotatably connected to an arm 32 by a pin. In addition, the arm 32 is fixed and integrated with a rudder surface 30 of an aircraft. An end portion of the rudder surface 30 integrated with the arm 32 is rotatably supported by a third fulcrum 31. The rudder surface 30 to be described later refers to, for example, an aileron, an elevator, a ladder, and a horizontal stabilizer.

Figure 3:
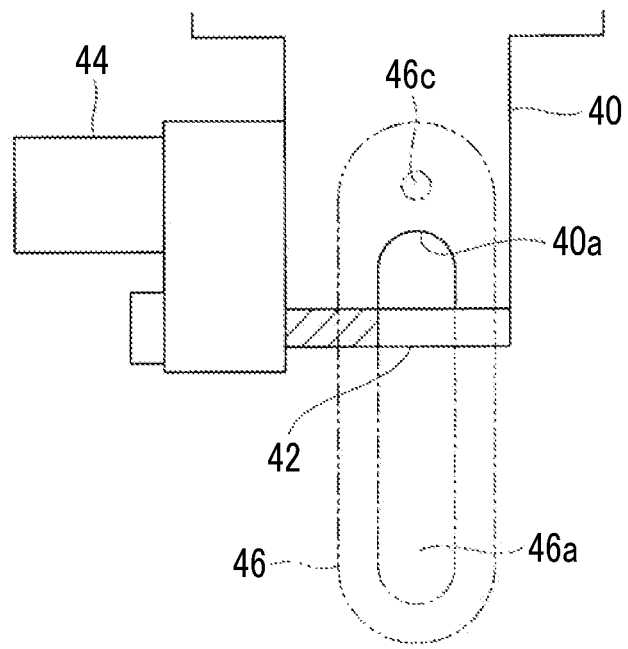
FIG. 3 is a front view of a structure around the support member when the support member is set at the supporting position in the electric actuator device according to the first embodiment.
Figure 4:
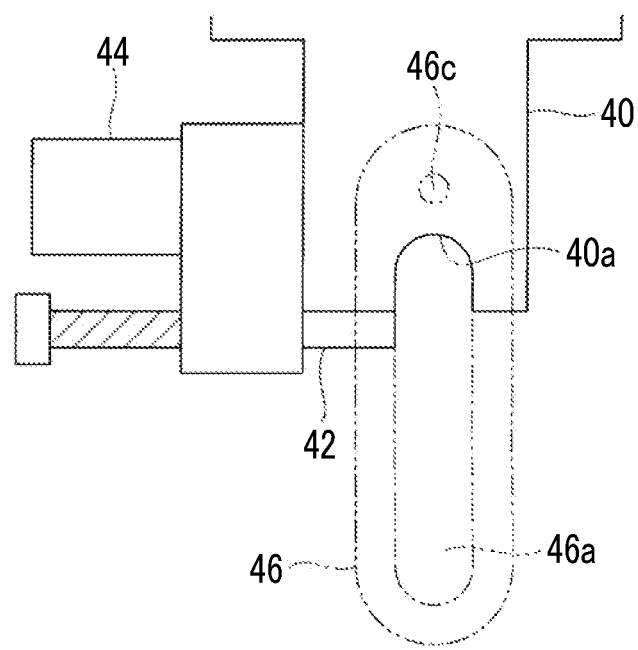
FIG. 4 is a front view of the structure around the support member when the support member is set at a retracted position in the electric actuator device according to the first embodiment.

On the other hand, the aircraft body side fulcrum 24 is connected to an airframe structure 40 on an aircraft body side (refer to FIG. 1). Details thereof will be described with reference to FIGS. 3 to 7. As illustrated in FIG. 3, an inverted U-shaped notch 40a which is open downwards is provided in a lower end of the airframe structure 40. In addition, a support member 42 is provided below the notch 40a. The support member 42 extends in a substantially horizontal direction, and an electric motor 44 for the support member 42 is connected to a base end portion (left end portion in FIG. 3). The electric motor 44 for the support member 42 is fixed to the airframe structure 40. FIG. 3 illustrates a state where the support member 42 is set at a supporting position, and FIG. 4 illustrates a state where the support member 42 is set at a retracted position. The supporting position means a position where the support member 42 closes an opening below the notch 40a when a structure around the support member 42 is seen from the front (refer to FIG. 3). In addition, the retracted position means a position where the support member 42 retracts from the supporting position in the substantially horizontal direction (the support member 42 moves to the left from the position of the support member 42 shown in FIG. 3) and releases the opening below the notch 40a when the structure around the support member 42 is seen from the front (refer to FIG. 4). The support member 42 is moved between the supporting position and the retracted position by the electric motor 44 for the support member 42. The control unit is connected to the electric motor 44 for the support member 42, and controls the electric motor 44 for a the support member 42.

Figure 5:
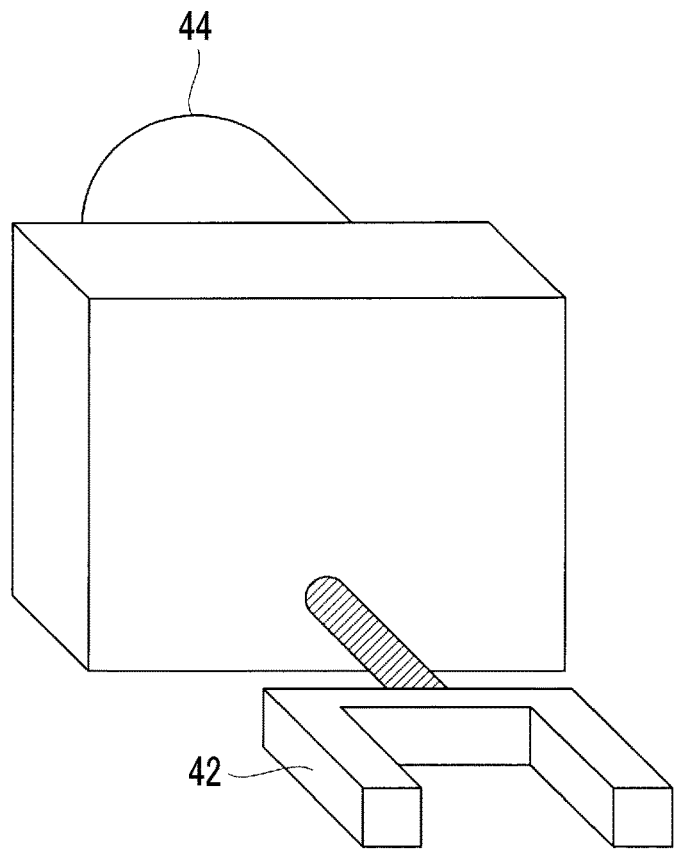
FIG. 5 is a view illustrating an example of a form of the support member and a mechanism that performs an advancing and retracting operation of the support member.
Figure 6:
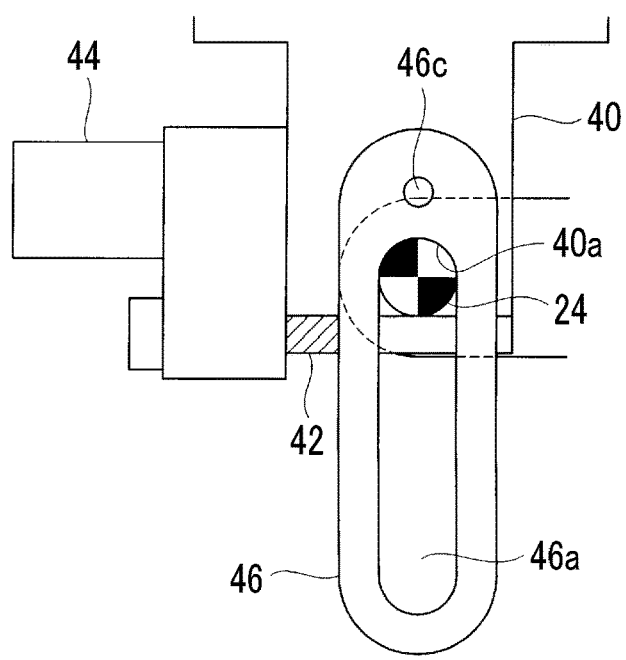
FIG. 6 is a front view of a structure around the support member when the support member is set at the supporting position and supports a second fulcrum in the electric actuator device according to the first embodiment.
Figure 7:
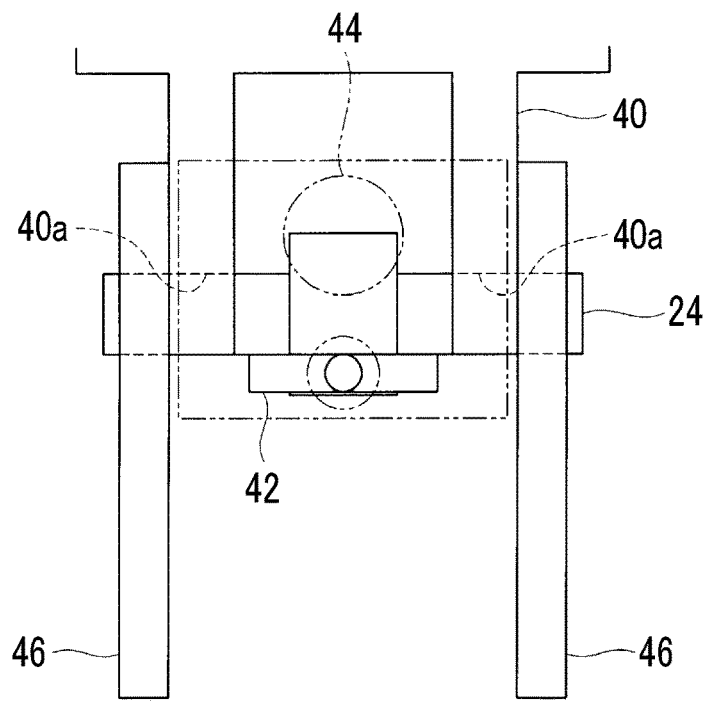
FIG. 7 is a left side view of FIG. 6.
Figure 8:
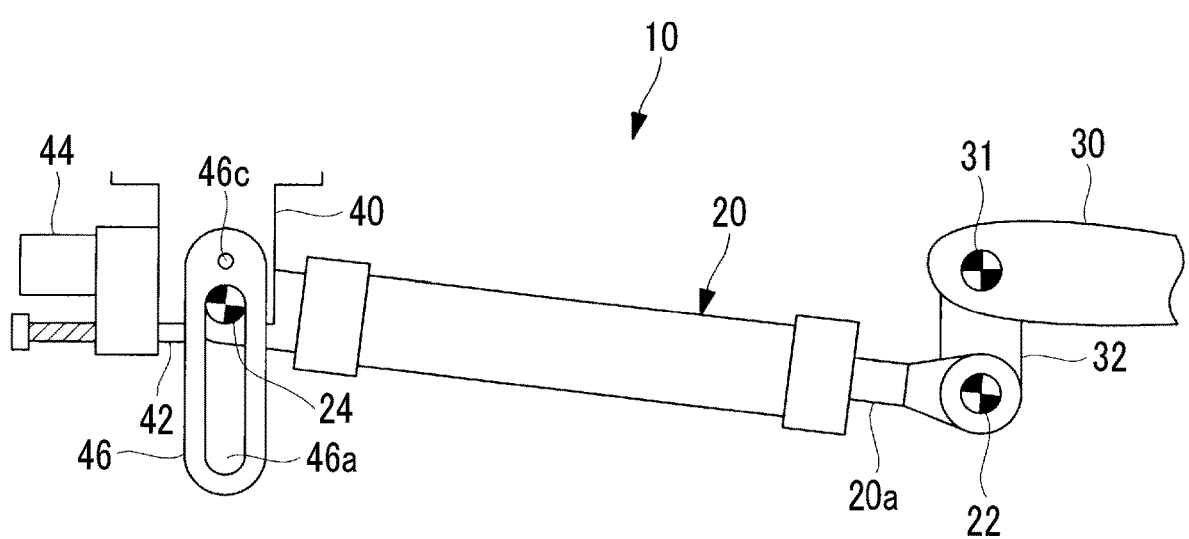
FIG. 8 is a front view of the electric actuator device according to the first embodiment in a case where the support member is set at the retracted position.

The support member 42 is in a U-shape in plan view as illustrated in FIG. 5, and can support the lower end of the aircraft body side fulcrum 24 of the electric actuator body 20 from below as illustrated in FIGS. 6 and 7 in a case of being set at the supporting position. In addition, an upper portion of the aircraft body side fulcrum 24 is supported by being fitted into the notch 40a of the airframe structure 40. That is, the aircraft body side fulcrum 24 is rotatably supported in a state of being sandwiched between the notch 40a and the support member 42.

The aircraft body side fulcrum 24 is inserted to a guide path 46a included in a pendulum (holding member) 46 provided on each of both end sides of the airframe structure 40 (refer to FIG. 7). The pendulum (holding member) 46 has a rounded rectangular shape extending in an up-and-down direction when seen from the front (refer to FIG. 6), and the guide path 46a having a rounded rectangular shape extending in the up-and-down direction as well is provided therein. Radii of an upper end and a lower end of the guide path 46a and a width of the guide path 46a correspond to a diameter of the inserted aircraft body side fulcrum 24. The pendulum (holding member) 46 is rotatably supported by a rotation point 46c provided above the aircraft body side fulcrum 24. However, in a case where the aircraft body side fulcrum 24 is supported in a state of being sandwiched between the notch 40a and the support member 42, a degree of freedom of rotating about the rotation point 46c of the pendulum (holding member) 46 is restrained by the aircraft body side fulcrum 24 inserted in the guide path 46a, and thus the pendulum (holding member) 46 cannot rotate.

As illustrated in FIG. 1, by the electric actuator body 20 bringing the aircraft body side fulcrum 24 connected to the airframe structure 40 on the aircraft body side and the rudder surface side fulcrum 22 on a rudder surface 30 side closer to each other or separating away from each other, a rudder angle of the rudder surface 30 is adjusted with the third fulcrum 31 as a center via the arm 32 integrated with the rudder surface 30.

Next, an operation of the electric actuator device 10 in a case where a failure such as mechanical jamming has occurred in the electric actuator body 20 will be described.

The failure detecting unit included in the control unit compares a position of the rod 20a required for the electric actuator body 20 (degree of closeness and separation) with an actual position of the rod 20a through a control signal from the aircraft side, and determines that a failure such as mechanical jamming has occurred in the electric actuator body 20 in a case where a shift that is equal to or larger than a predetermined value is detected. In a case where a failure in the electric actuator body 20 is detected, the control unit transmits a drive signal to the electric motor 44 for the support member 42, and moves the support member 42 from the supporting position illustrated in FIG. 1 to the retracted position illustrated in FIG. 8.

Figure 9:
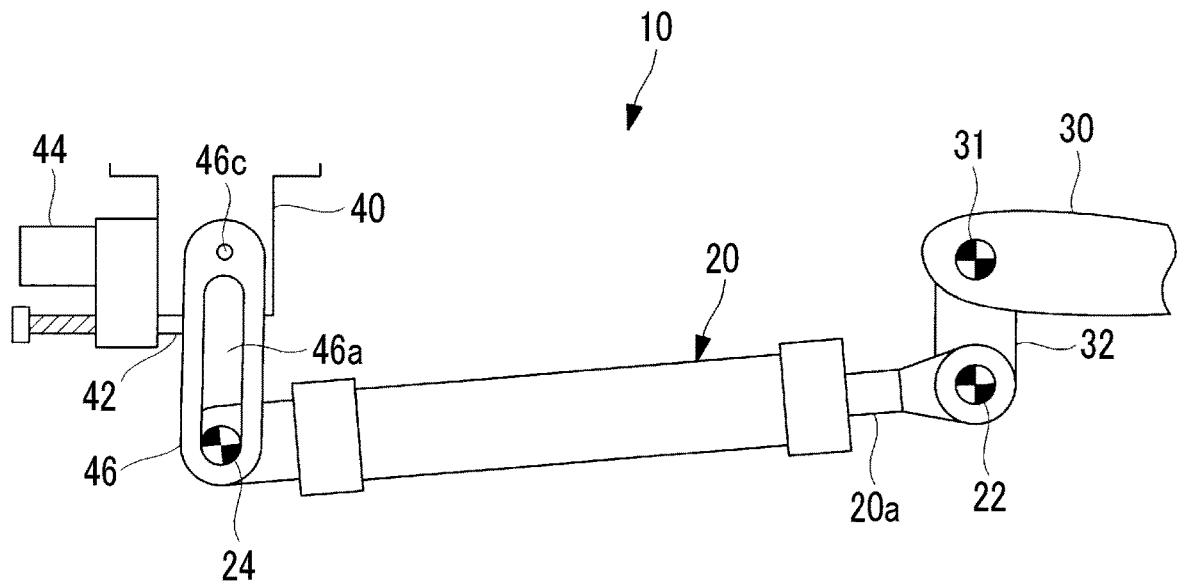
FIG. 9 is a front view of the electric actuator device according to the first embodiment in a case where the second fulcrum is held by a pendulum.

When the support member 42 moves to the retracted position, the lower end of the aircraft body side fulcrum 24 is released from supporting by the support member 42. The aircraft body side fulcrum 24 released from the supporting by the support member 42 falls along the guide path 46a of the pendulum (holding member) 46 due to a dead weight of the electric actuator body 20 as illustrated in FIG. 9, and is held in the guide path 46a (at a lower end position of the guide path 46a in FIG. 9). That is, the aircraft body side fulcrum 24 is released from connection to the airframe structure 40. Simultaneously, the pendulum (holding member) 46 becomes rotatable about the rotation point 46c. At this time, the aircraft body side fulcrum 24 held in the guide path 46a is given with a degree of freedom within a movable range of the pendulum (holding member) 46 and within a range of the guide path 46a, and simultaneously, the electric actuator body 20 is also given with a degree of freedom within the movable range of the pendulum (holding member) 46 and within the range of the guide path 46a. The rudder surface 30 provided on a rudder surface side fulcrum 22 side of the electric actuator body 20 is also given with a degree of freedom within a movable range of the electric actuator body 20, and consequently, mechanical restraint between the rudder surface 30 and the airframe structure 40 is released.

The following effects are achieved in the embodiment. The arm 32 of the rudder surface 30 of the aircraft and the airframe structure 40 on the aircraft body side are connected to each other by the rudder surface side fulcrum 22 of the electric actuator body 20 and the aircraft body side fulcrum 24 are brought closer to or separated away from each other, and the pendulum (holding member) 46 that holds the aircraft body side fulcrum 24 when the support member 42 is moved to the supporting position where a lower side of the aircraft body side fulcrum 24 is supported and the retracted position is included. According to this, in a case where mechanical jamming has occurred in the electric actuator body 20, the lower end of the aircraft body side fulcrum 24 is released from supporting, and connection between the airframe structure 40 and the aircraft body side fulcrum 24 can be released by moving the support member 42 that supports the aircraft body side fulcrum 24 of the electric actuator body 20 from below to the retracted position. Accordingly, the electric actuator body 20 is given with a degree of freedom within the movable range of the pendulum (holding member) 46 and within the range of the guide path 46a, and consequently, mechanical restraint between the rudder surface 30 on the rudder surface side fulcrum 22 side and the airframe structure 40 on an aircraft body side fulcrum 24 side, which are connected to each other via the electric actuator body 20, can be released. As a result, the rudder surface 30 comes into a free state of not going against an air flow around a wing, and thus a risk factor for aircraft airframe control caused by fixing of the rudder surface 30 at an unintended rudder angle can be excluded. In this case, since airframe control can be performed by another rudder surface where malfunction has not occurred, airframe controllability can be maintained.

In addition, since the aircraft body side fulcrum 24 is held in the guide path by the pendulum (holding member) 46 and thereby does not fall off, a risk of other components or an aircraft body becoming damaged can be reduced.

In addition, since the electric actuator device 10 is configured by a combination of simple mechanisms, assemblability, maintenance, and reliability with respect to malfunction are good.

In addition, restoration convenience is also good since restoration work after actuator body jamming elimination (repair) is performed simply by bringing the support member 42 back to an original position after bringing the aircraft body side fulcrum 24 back to a fixed position along the guide path 46a.

Figure 10:
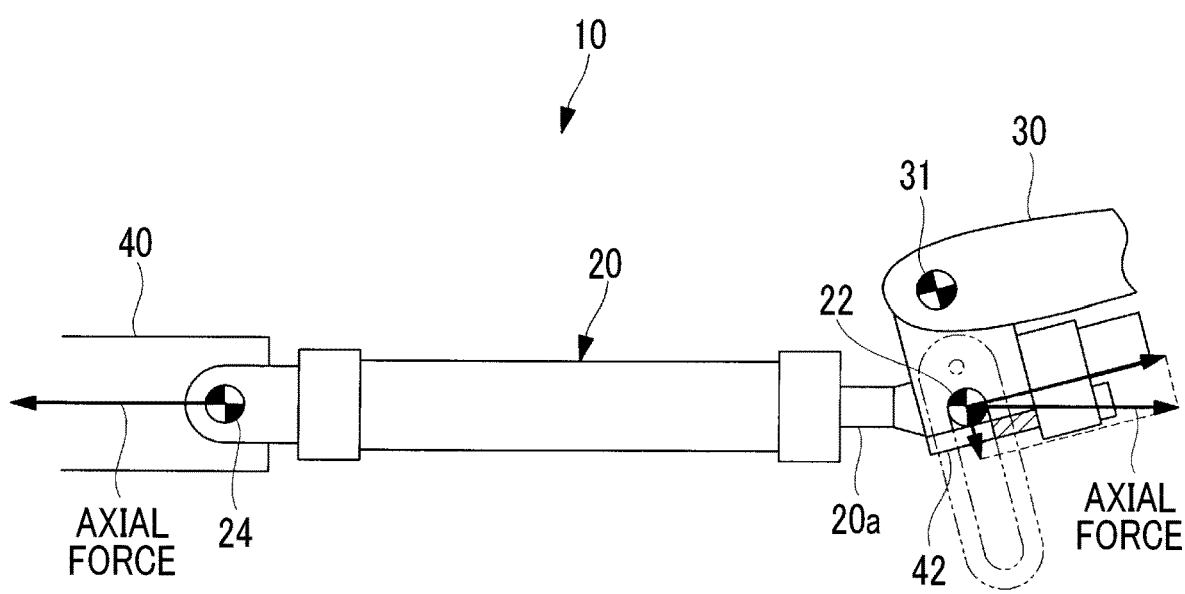
FIG. 10 is a front view illustrating a case where a rudder angle is large in another example of the electric actuator device according to the first embodiment.
Figure 11:
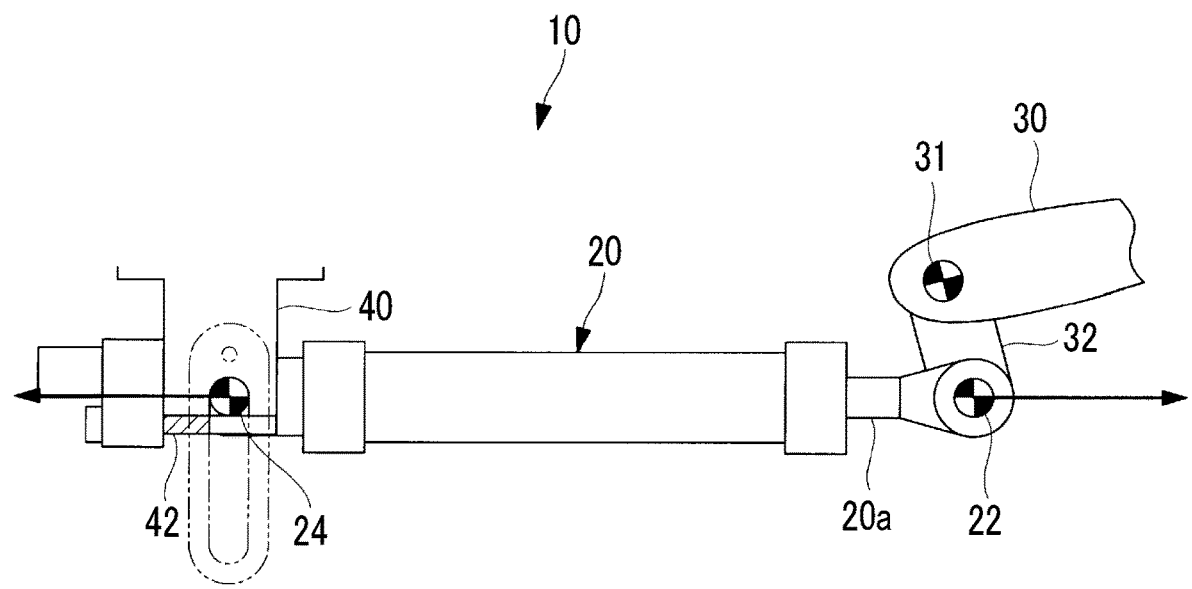
FIG. 11 is a front view illustrating a case where the rudder angle is large in the electric actuator device according to the first embodiment.

As illustrated in FIG. 10, the support member 42 may be configured to support a lower end of the rudder surface side fulcrum 22 on the rudder surface 30 side. However, in a case where the rudder angle is large, a part of an axial force applied to the electric actuator body 20 is applied to the rudder surface side fulcrum 22 in a direction of pressing the support member 42 downwards, thereby applying a load of preventing an advancing and retracting operation of the support member 42. On the contrary, as illustrated in FIG. 11, when the support member 42 is configured to support the lower end of the aircraft body side fulcrum 24 on an airframe structure 40 side, a part of the axial force is not applied in the direction of pressing the support member 42 downwards even when the rudder angle is large, and thereby the advancing and retracting operation can be performed with smaller power. That is, the miniaturization of the electric motor 44 that drives the support member 42 can be realized.

Second Embodiment

Next, the electric actuator device 10 according to a second embodiment will be described with reference to FIG. 12.

The embodiment is different from the first embodiment described above in terms of a form of the pendulum (holding member) 46, and the rest points are the same. Therefore, points that are different from the first embodiment only will be described. Others will be assigned with the same reference signs, and description thereof will be omitted.

Figure 12:
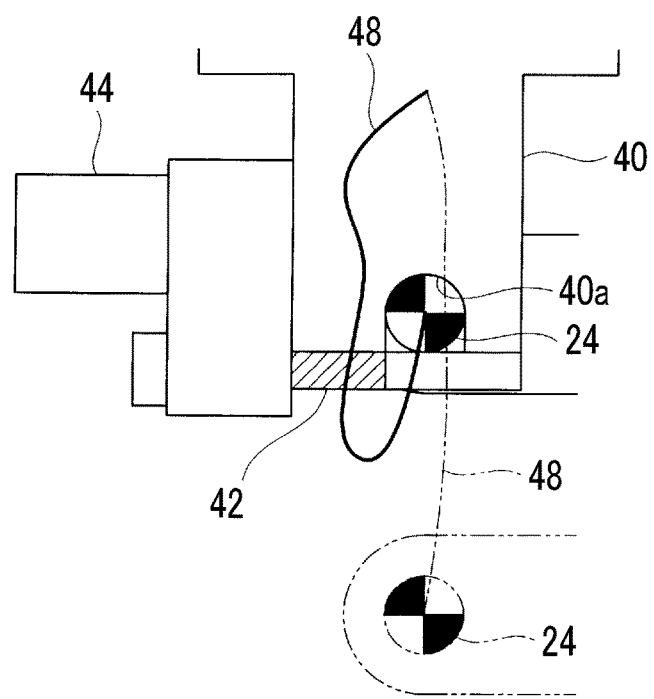
FIG. 12 is a front view of a structure around a support member in an electric actuator device according to a second embodiment.

As illustrated in FIG. 12, the aircraft body side fulcrum 24 and the airframe structure 40 are connected to each other via a wire 48. When the support member 42 moves to the retracted position and the aircraft body side fulcrum is released from supporting, the aircraft body side fulcrum 24 falls, and is supported by the wire 48. At this time, the aircraft body side fulcrum 24 is given with a degree of freedom with respect to the rudder surface 30 within a movable range of the wire (holding member) 48, and mechanical restraint between the rudder surface 30 and the airframe structure 40 is released.

The following effects are achieved in the embodiment. The arm 32 of the rudder surface 30 of the aircraft and the airframe structure 40 on the aircraft body side are connected to each other by the rudder surface side fulcrum 22 of the electric actuator body 20 and the aircraft body side fulcrum 24 are brought closer to or separated away from each other, and the wire (holding member) 48 that holds the aircraft body side fulcrum 24 when the support member 42 is moved to the supporting position where the lower side of the aircraft body side fulcrum 24 is supported and the retracted position is included. According to this, in a case where mechanical jamming has occurred in the electric actuator body 20, the lower end of the aircraft body side fulcrum 24 is released from supporting, and connection between the airframe structure 40 and the aircraft body side fulcrum 24 can be released by moving the support member 42 that supports the aircraft body side fulcrum 24 of the electric actuator body 20 from below to the retracted position. Accordingly, the electric actuator body 20 is given with a degree of freedom within the movable range of the wire (holding member) 48, and consequently, mechanical restraint between the rudder surface 30 on the rudder surface side fulcrum 22 side and the airframe structure 40 on the aircraft body side fulcrum 24 side, which are connected to each other via the electric actuator body 20, can be released. As a result, the rudder surface 30 comes into a free state of not going against an air flow around the wing, a risk factor for aircraft airframe control caused by fixing of the rudder surface 30 at an unintended rudder angle can be excluded. In this case, since airframe control can be performed by another rudder surface where malfunction has not occurred, airframe controllability can be maintained.

In addition, since the aircraft body side fulcrum 24 is held within a range of a length of the wire 48 and thereby does not fall off, a risk of other components or the aircraft body becoming damaged can be reduced. Since the electric actuator device 10 is configured by a combination of simple mechanisms, assemblability, maintenance, and reliability with respect to malfunction are good.

Restoration convenience is also good since restoration work after actuator body jamming elimination (repair) is performed simply by bringing the support member 42 back to the original position after bringing the aircraft body side fulcrum 24 back to the fixed position.

As illustrated in FIG. 10, the support member 42 may be configured to support the lower end of the rudder surface side fulcrum 22 on the rudder surface 30 side.

REFERENCE SIGNS LIST

10: electric actuator device
20: electric actuator body
20*a*: rod
20*b*: cylinder
20*c*: gearbox for screw
20*d*: electric motor for screw
20*e*: screw
20*f*: ball nut
22: rudder surface side fulcrum (first fulcrum)
24: aircraft body side fulcrum (second fulcrum)
30: rudder surface
31: third fulcrum
32: arm
40: airframe structure
40*a*: notch
42: support member
44: electric motor for support member
46: pendulum (holding member)
46*a*: guide path
46*c*: rotation point
48: wire (holding member)

The invention claimed is:

1. An electric actuator device comprising:
   an electric actuator body that has a first fulcrum connected to a rudder surface side of an aircraft and a second fulcrum connected to an aircraft body side of the aircraft, and is driven by an electric motor such that the first fulcrum and the second fulcrum are brought closer to or separated away from each other;
   a support member that advances and retracts between a supporting position at which the support member supports a lower side of one of the first fulcrum and the second fulcrum and a retracted position at which the support member is retracted from the lower side of the one of the first fulcrum and the second fulcrum; and
   a holding member that holds the one of the first fulcrum and the second fulcrum when the support member is positioned at the retracted position,
   wherein in the supporting position of the support member, the one of the first fulcrum and the second fulcrum is rotatably supported, and
   wherein in the retracted position of the support member, a connection between the one of the first fulcrum and the second fulcrum and a corresponding one of the rudder surface side and the aircraft body side is released to thereby release a mechanical restraint between the rudder surface side of the aircraft and the aircraft body side of the aircraft which are connected to each other via the electric actuator body.

2. The electric actuator device according to claim 1, wherein the support member advances and retracts with respect to the second fulcrum.

3. The electric actuator device according to claim 1, further comprising:
   an electric motor for the support member that performs an advancing and retracting operation of the support member between the supporting position and the retracted position;
   a control unit that controls the electric motor for the support member; and
   a failure detecting unit that detects a failure in an operation of the electric actuator body,
   wherein the control unit operates the support member to move from the supporting position to the retracted position in a case where the failure in the operation of the electric actuator body is detected by the failure detecting unit.

4. The electric actuator device according to claim 1, wherein the holding member is a pendulum that includes a movable guide path in which the one of the first fulcrum and the second fulcrum is held so as to be movable with a degree of freedom when the connection between the one of the first fulcrum and the second fulcrum and the corresponding one of the rudder surface side and the aircraft body side is released, and has a rotation point above the one of the first fulcrum and the second fulcrum, and
   the pendulum is rotatable when the connection between the one of the first fulcrum and the second fulcrum and the corresponding one of the rudder surface side and the aircraft body side is released.

5. The electric actuator device according to claim 1, wherein the holding member is a wire in which the one of the first fulcrum and the second fulcrum is held.

* * * * *